(12) United States Patent
Wong et al.

(10) Patent No.: US 11,262,510 B2
(45) Date of Patent: Mar. 1, 2022

(54) RATTLE-FREE PANEL HOOK FOR A FIBER OPTIC ADAPTER OUTER HOUSING

(71) Applicant: Senko Advanced Components Inc, Marlborough, MA (US)

(72) Inventors: Kim Man Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/661,797

(22) Filed: Oct. 23, 2019

(65) Prior Publication Data
US 2020/0132944 A1 Apr. 30, 2020

Related U.S. Application Data

(60) Provisional application No. 62/750,408, filed on Oct. 25, 2018.

(51) Int. Cl.
*G02B 6/40* (2006.01)
*G02B 6/38* (2006.01)

(52) U.S. Cl.
CPC .................. *G02B 6/3887* (2013.01)

(58) Field of Classification Search
CPC ... G02B 6/3887; G02B 6/3825; G02B 6/3897
USPC .... 385/54, 62–65, 81, 87, 89, 135, 136, 139
See application file for complete search history.

(56) References Cited

U.S. PATENT DOCUMENTS

| | | | |
|---|---|---|---|
| 5,883,995 | A | 3/1999 | Lu |
| 6,079,881 | A | 6/2000 | Roth |
| 6,179,477 | B1 | 1/2001 | De Marchi |
| 6,247,849 | B1 | 6/2001 | Liu |
| 6,461,054 | B1 | 10/2002 | Iwase |
| 6,550,978 | B2 | 4/2003 | De Marchi |
| 6,561,699 | B1 | 5/2003 | De Marchi |
| 6,685,362 | B2 | 2/2004 | Burkholder et al. |
| D608,285 | S | 1/2010 | Sato et al. |
| 7,785,018 | B2 | 8/2010 | Jones et al. |
| 9,196,997 | B2 | 11/2015 | Sanders et al. |
| 9,279,940 | B2 | 3/2016 | Mamiya et al. |
| 9,453,963 | B2 | 9/2016 | Sato |
| 9,494,746 | B2 | 11/2016 | Sanders et al. |
| 9,632,256 | B2 | 4/2017 | Yang et al. |
| 9,709,754 | B2 | 7/2017 | Sanders et al. |
| 10,012,799 | B2 | 7/2018 | Sanders et al. |
| 10,101,539 | B2 | 10/2018 | Yang et al. |
| 2005/0286833 | A1 | 12/2005 | Kramer et al. |

(Continued)

FOREIGN PATENT DOCUMENTS

| CA | 2350703 A1 | 12/2001 |
|---|---|---|
| EP | 0893716 A1 | 1/1999 |

(Continued)

*Primary Examiner* — Kaveh C Kianni
*Assistant Examiner* — Hung Q Lam

(57) ABSTRACT

An adapter assembly is formed from an adapter housing with a recess configured to accept an adapter panel hook. The adapter assembly is secured within a panel using the adapter panel hook. The adapter panel hook has opposing side portions connected by a joining plate. Each side portion has an elastic pawl with opposing elastic members. The elastic members are configured to be secured between the adapter outer housing and panel wall opening to reduce vibration at the adapter housing.

14 Claims, 8 Drawing Sheets

(56) References Cited

U.S. PATENT DOCUMENTS

| | | | | |
|---|---|---|---|---|
| 2014/0016901 A1* | 1/2014 | Lambourn | ........... | G02B 6/3897 |
| | | | | 385/75 |
| 2014/0023322 A1* | 1/2014 | Gniadek | .............. | G02B 6/3825 |
| | | | | 385/56 |
| 2018/0180819 A1 | 6/2018 | Zhu et al. | | |

FOREIGN PATENT DOCUMENTS

| | | |
|---|---|---|
| EP | 0893718 A1 | 1/1999 |
| JP | 4824608 B2 | 11/2011 |
| WO | 2016201630 A1 | 12/2016 |

* cited by examiner

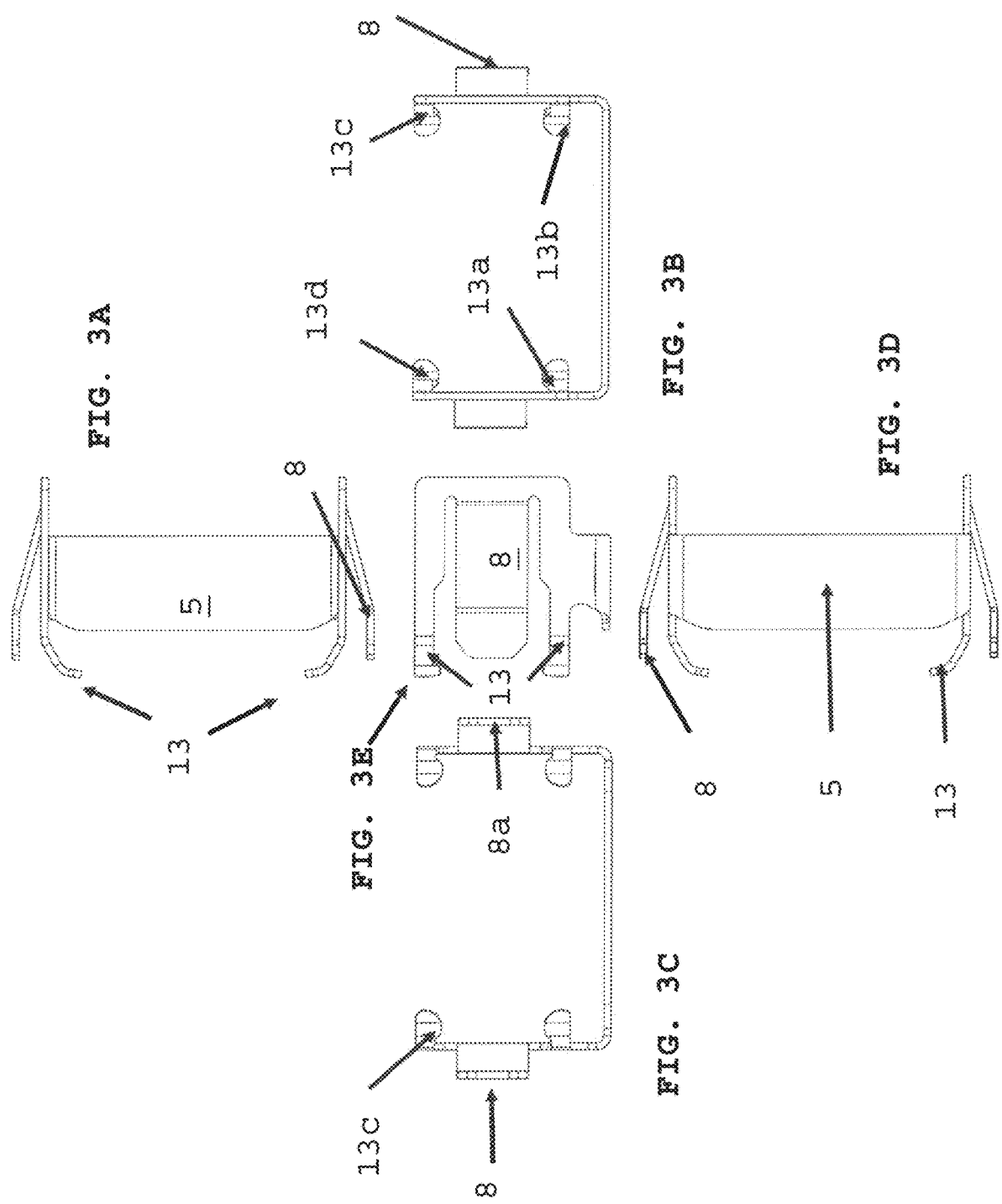

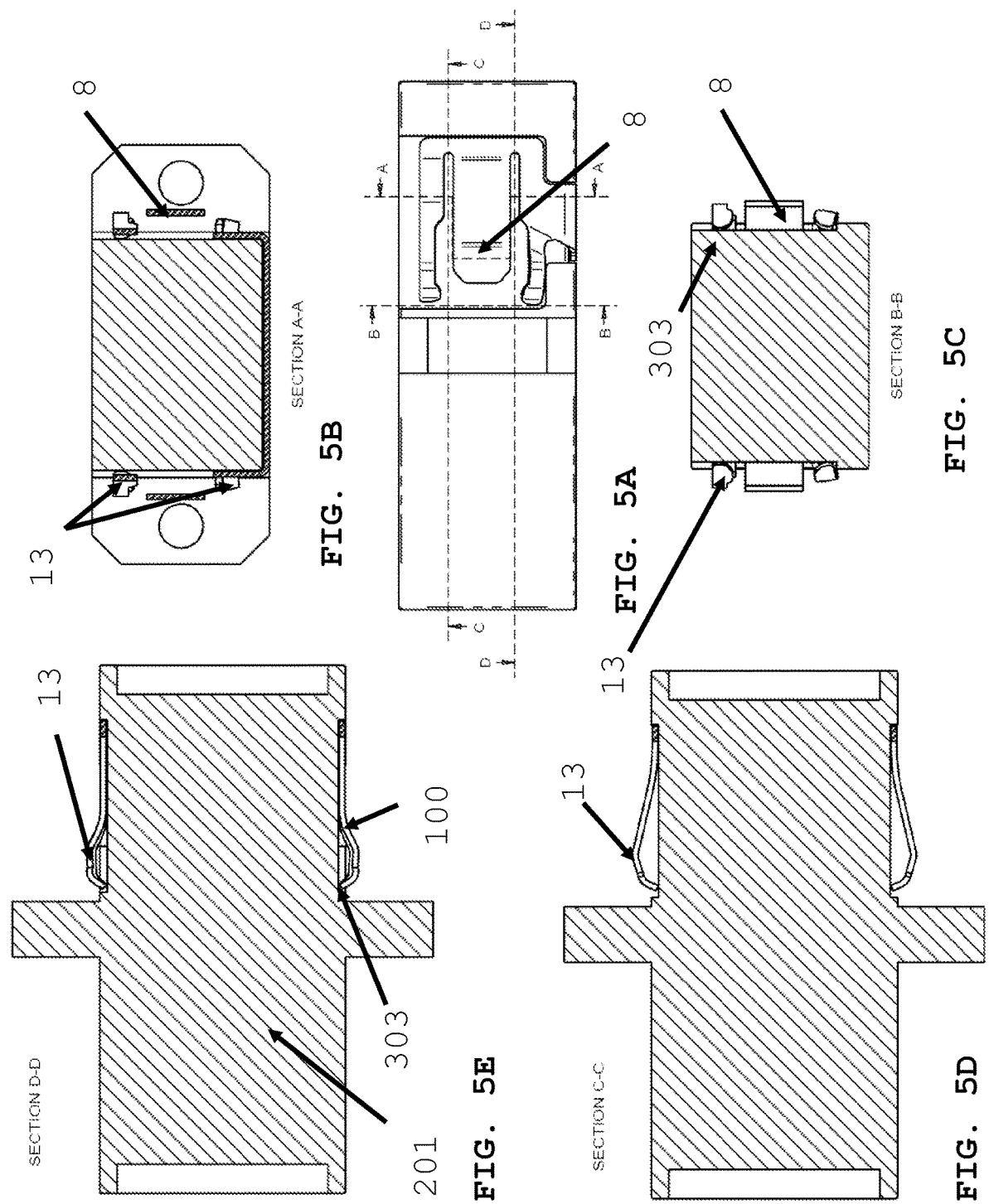

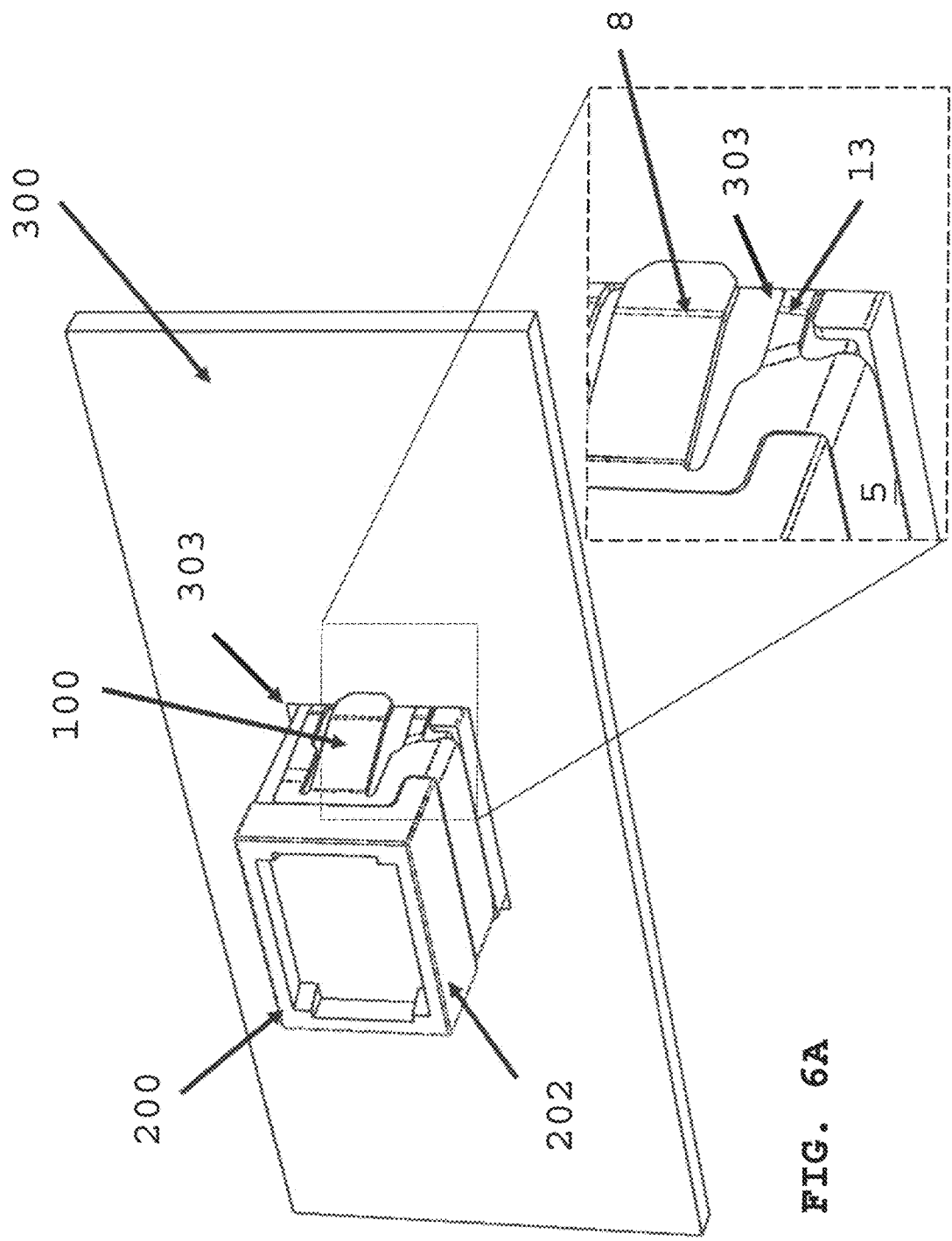

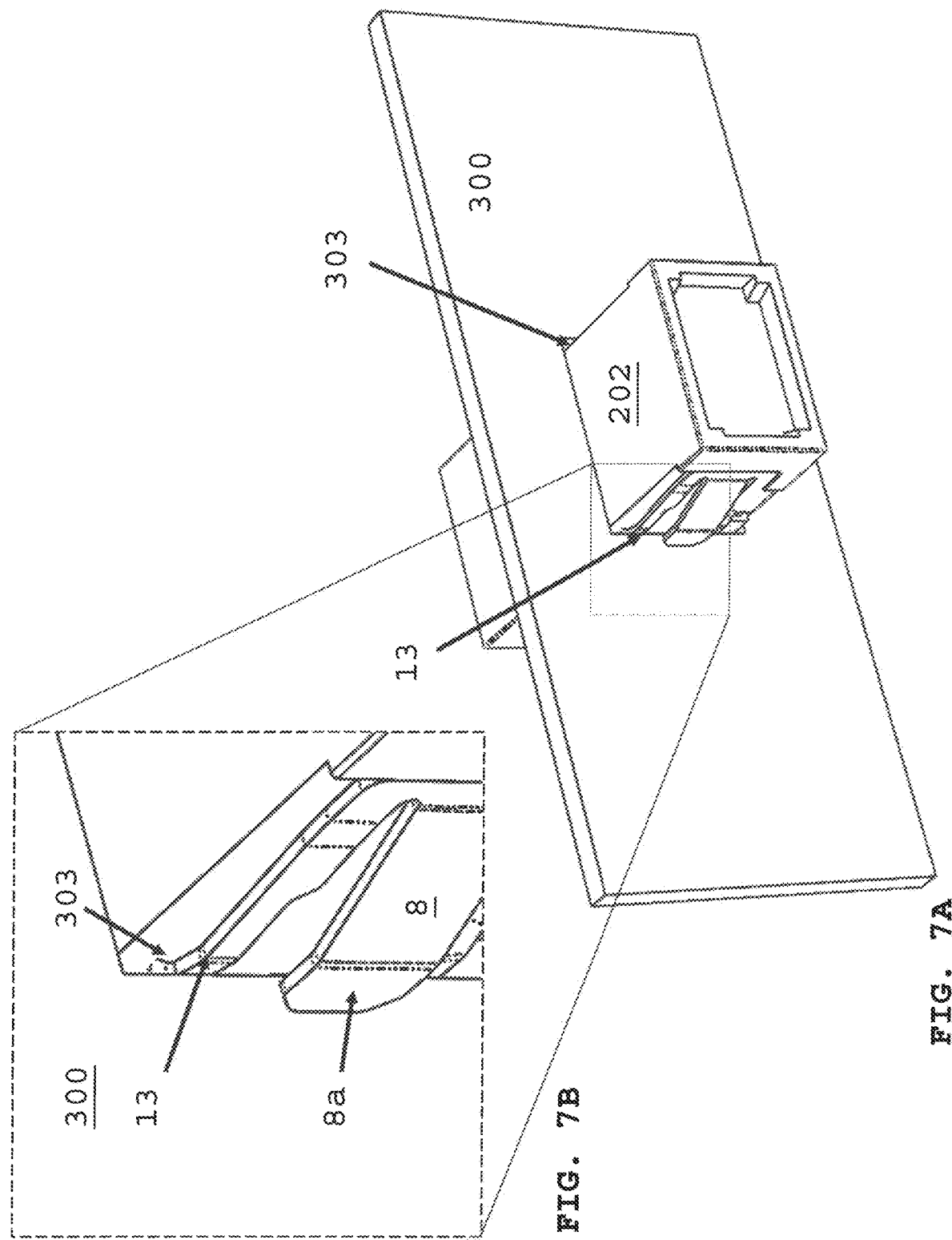

RATTLE-FREE PANEL HOOK FOR A FIBER OPTIC ADAPTER OUTER HOUSING

RELATED APPLICATIONS

This application claims priority to U.S. Provisional patent application 62/750,408 filed on Oct. 25, 2018 titled "Adapter Hook for Panel Insert and Method", which is fully incorporated into this application.

FIELD OF THE INVENTION

The described technology generally relates to components for connecting data transmission elements and, more specifically, to panel hooks that are secured to an adapter outer housing. Adapters are configured to connect different types of fiber optic connectors and connector assemblies. Adapters are stacked or positioned within panel racks to support various network configurations. This panel hook is designed to reduce rattle or movement of the adapter, which can result in the fiber optic connector becoming, disconnected.

BACKGROUND

Fiber optics have become the standard cabling medium used by data centers to meet the growing needs for data volume, transmission speeds, and low losses. An optical fiber connector is a mechanical device disposed at an end of an optical fiber that acts as a connector of optical paths, for example, when optical fibers are joined together. An optical fiber connector may be coupled with an adapter to connect an optical fiber cable to other optical fiber cables or devices. An adapter may generally include a housing having at least one port that is configured to receive and hold a connector to facilitate the optical connection of one connector to another connector or device. For example, an LC adapter is typically configured to receive one or more standard sized LC connectors.

The provided structure secures a plural of adapters within a panel or enclosure. The panel hooks are usually made of metal but may be formed from plastic. Accordingly, there is a need for a panel hook that provides rattle free performance.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a panel hook has opposing sides connected by a joining plate. Each side extends downward perpendicular to the normal plane formed by the joining plate or at ninety (90) degrees at an end of the joining plate. Each side has an elastic pawl or a panel mount clip. On opposing sides of the elastic pawl, and interconnector to the elastic pawl are rattle free or elastic member. The panel hook is snapped over an outer housing of the adapter to form an adapter assembly. The opposing elastic pawls prevent the adapter assembly from being pushed through an opening that houses the adapter assembly. The plural of elastic members reduces horizontal or vertical movement or rattle of the adapter assembly depending on the location of the elastic members formed as part of the panel hook. The panel hook is one-piece and made of metal, but can be formed from plastic.

In the present invention, the adapter assembly is an adapter with opposing ports configured to accept differing fiber optic connectors along a longitudinal axis. The rattle-free panel hook may be attached to a transceiver housing for securing to a panel.

BRIEF DESCRIPTION OF THE DRAWINGS

The above and other objects of the present invention will become more readily apparent from the following detailed description taken in connection with the accompanying drawings.

FIG. 3A is a top view of the adapter panel hook;
FIG. 3B is a back end view of the adapter panel hook;
FIG. 3C is a front end view of the adapter panel hook;
FIG. 3D is a bottom view of the adapter panel hook;
FIG. 3E is a side view of the adapter panel hook;
FIG. 5A is a sectioned view of FIG. 4A;
FIG. 5B is a perspective view along section A-A;
FIG. 5C is a perspective view along section B-B;
FIG. 5D is a perspective view along section C-C;
FIG. 5E is a perspective view along section D-D;
FIG. 6A is a perspective right side view of the adapter assembly secured within a panel;
FIG. 6B is a zoomed view of adapter assembly of FIG. 6A;
FIG. 7A is a perspective left side view of the adapter assembly secured within a panel;
FIG. 7B is a zoomed view of adapter assembly of FIG. 7A.

DETAILED DESCRIPTION

The described technology generally relates to panel mounting clips secured to an outer housing of an adapter. The panel clip secures the adapter or adapters within an opening formed as part of a panel having a plural of adapter. The panel clip structure reduces or absorbs movement or jolts to the panel that are transmitted to the adapter which in turn could loosen a fiber optic connector. This would reduce data throughput on in a data center that has thousands of adapters with fiber optic connectors interconnected to another connector within another adapter, or to a transceiver.

Figure 1:
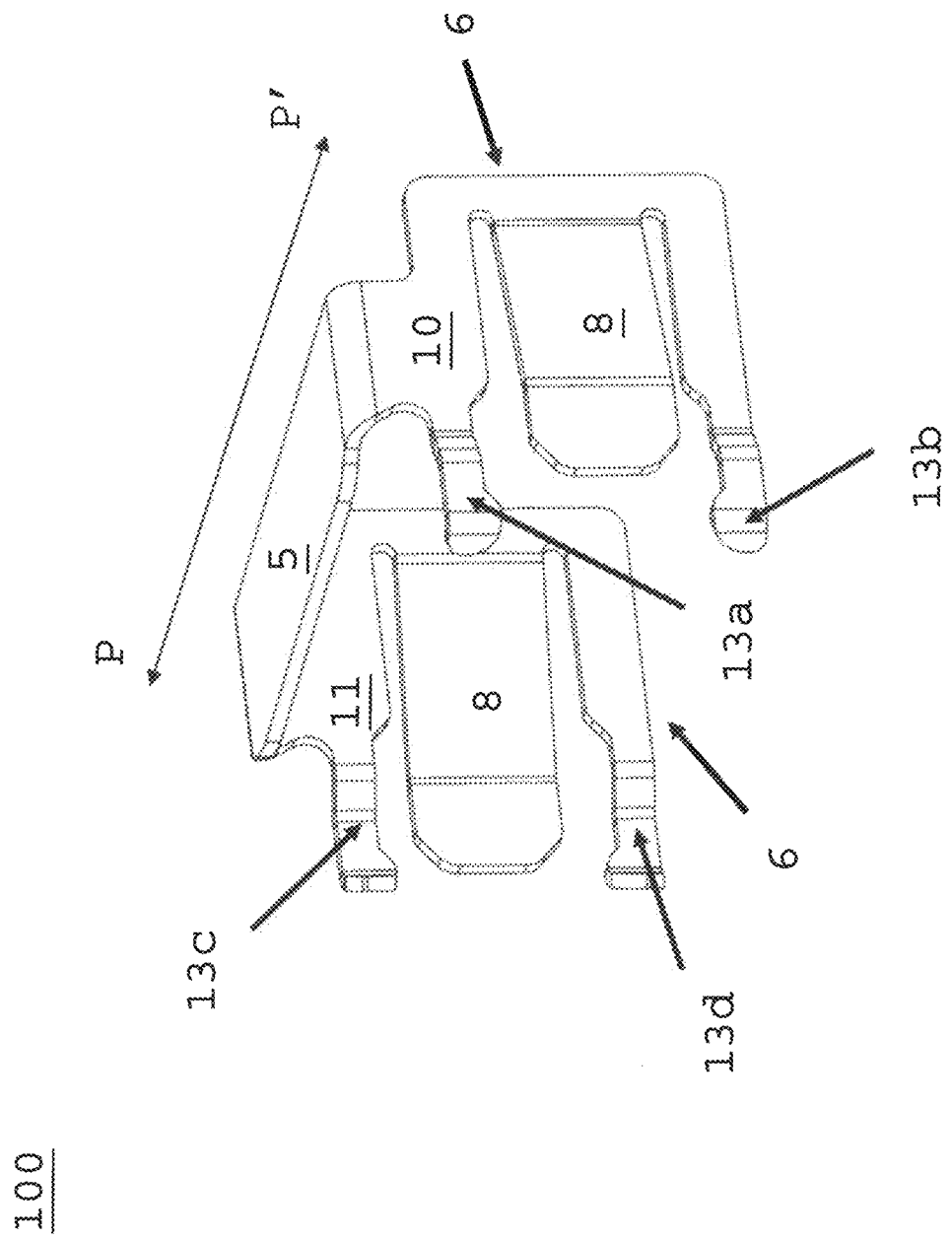
FIG. 1 is a perspective of the adapter panel hook according to the present invention.

FIG. 1 depicts an adapter panel hook (100). The hook has opposing side plates (6) that are substantially perpendicular to plane P-P' of joining plate (5). A first side plate has a first side portion (10) and a second side plate has a second side plate portion (11). The side plate portion interconnects opposing elastic members (13a, 13b) separated by elastic pawl (8). Elastic pawl (8) helps prevent adapter assembly (200) from being pushed through panel (300) (at FIG. 6A). Opposing elastic members (13a, 13b or 13c, 13d) are secured between adapter outer housing (201) and panel opening or gap (303) (at FIG. 6A).

Figure 2A:
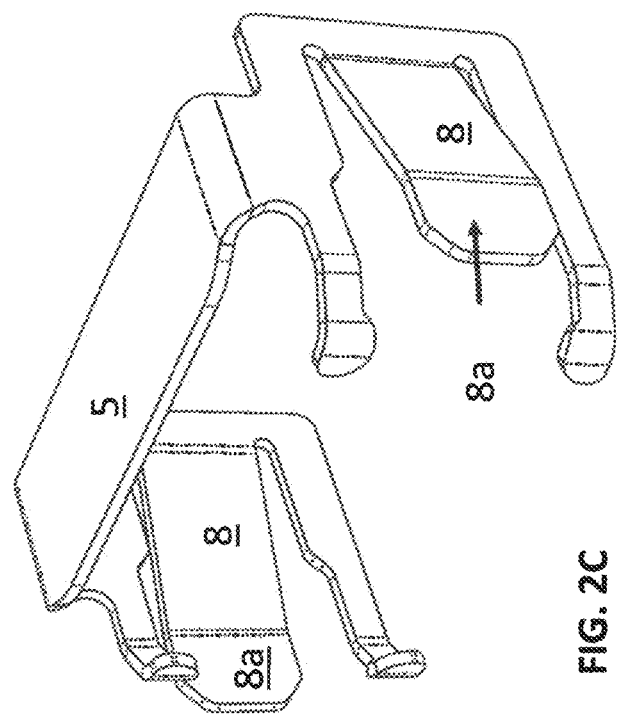
FIG. 2A is a perspective inside proximal view of FIG. 1.
Figure 2C:
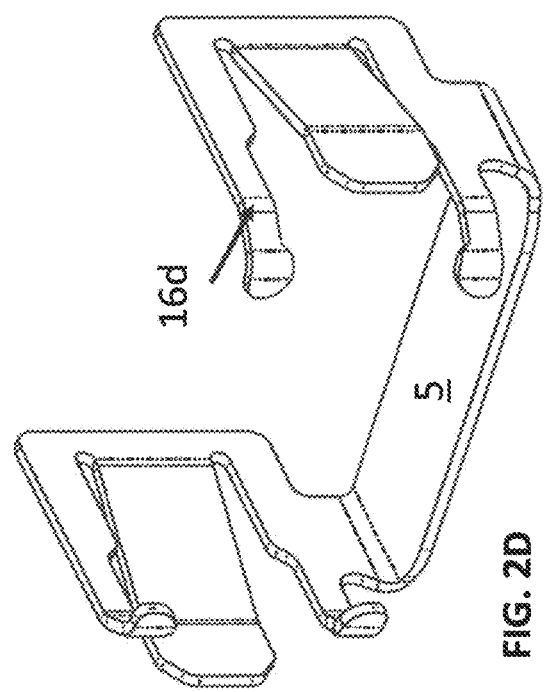
FIG. 2C is FIG. 1 illustrating different structure.
Figure 2B:
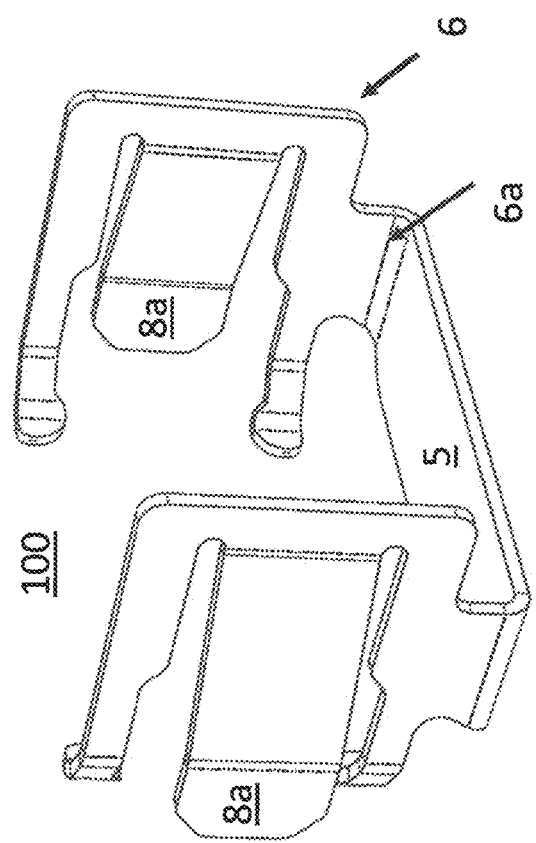
FIG. 2B is distal view of FIG. 2A.
Figure 2D:
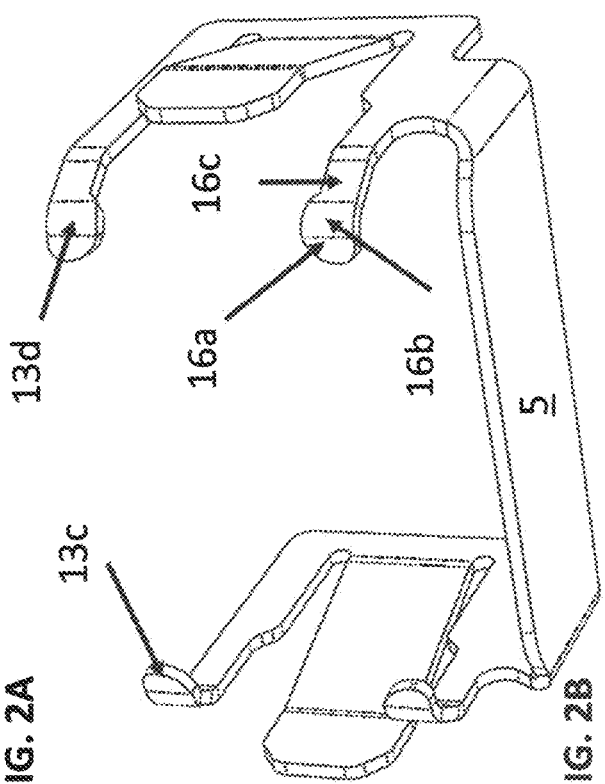
FIG. 2D is FIG. 2B illustrating different structure.

FIGS. 2A-FIG. 2D depict adapter panel hook (100) in various positions. The numbered components have the same meaning in the FIG. 2A-FIG. 2D views. FIG. 2A depicts adapter panel hook (100) at a proximal end with joining plate (5) connected to side plate (6) at substantially ninety (90) degrees bend (6a). Elastic pawl (8) has a slight inward bend end portion (8a) at a distal end of pawl (8). End portion bend (8a) helps prevent adapter assembly (200) from being pushed through the panel opening. FIG. 2B depicts a distal end of panel hook (100). Elastic members (13a-13d) bend inward. Each elastic arm (13) is configured to be secured between panel opening wall (303) and outer housing of adapter (202) (at FIG. 7B). A distal end of the elastic member is bent inward along series of bends or folds (16a-16c) to allow the elastic member to fit into a gap formed within panel (300). Upon insertion of adapter assembly into the panel opening (at FIG. 7A), the series of bends ensure bend (16a) is fitted at gap (303) binding the adapter assembly to the panel, and since bend (6a) is within gap (303) any vibrations within the panel are transmitted along the elastic members then distributed into side plate portion (10, 11) and into joining plate (5) substantially damping all but greatest vibrations before a vibration can loosen a fiber optic connector inserted into an adapter port. The series of inner bends (16a-16c) are formed at obtuse angles to their respective side plate portion (10, 11). FIG. 2C is similar to FIG. 2B. FIG. 2C illustrates inner bend end portion (8a) of pawl (8) and as a whole elastic pawl (8) bends opposite the elastic members. This is to help ensure adapter assembly does not go through panel housing opening. FIG. 2D depicts the most proximal bend (16d) in the series of bends (16a-16d) that make up the distal end of elastic member (13).

FIGS. 3A-3E depict a series of views of panel hook (100). FIG. 3A is a top view further showing elastic pawl (8) is outside of elastic members (13), and joining plate (5) connects opposing elastic pawls (8). FIG. 3D depicts a bottom view of panel hook (100), is similar to FIG. 3A as the panel hook is symmetric. The inward bend of elastic member (13) is more than the inward bend of elastic pawl (8). FIG. 3B depicts a back end view or the proximal end of the panel hook (100), FIG. 3C is a front end view of panel hook (100). Elastic pawl (8) has bend end portion (8a) and by contrast FIG. 3B does not show bend end portion (8a). FIG. 3D is a bottom view of panel hook (100). Joining plate (5) interconnects opposing elastic pawls (8) and elastic members (13). FIG. 3E is a side view illustrating side portion (10) interconnecting elastic, pawl (8) and elastic members (13).

Figure 4A:
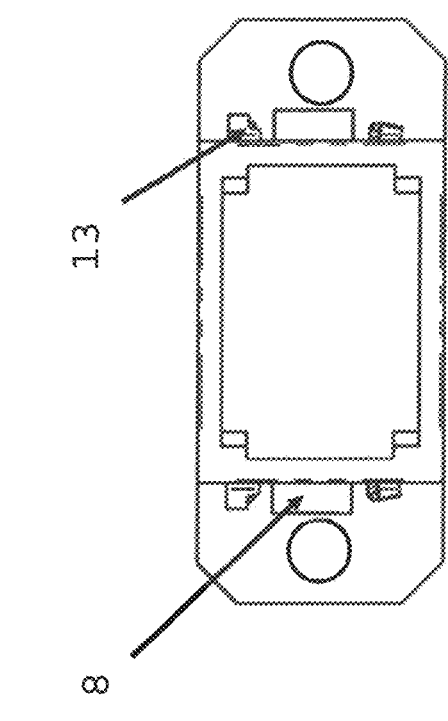
FIG. 4A is a side view of the adapter panel hook attached to an adapter to form the adapter panel hook assembly.
Figure 4B:
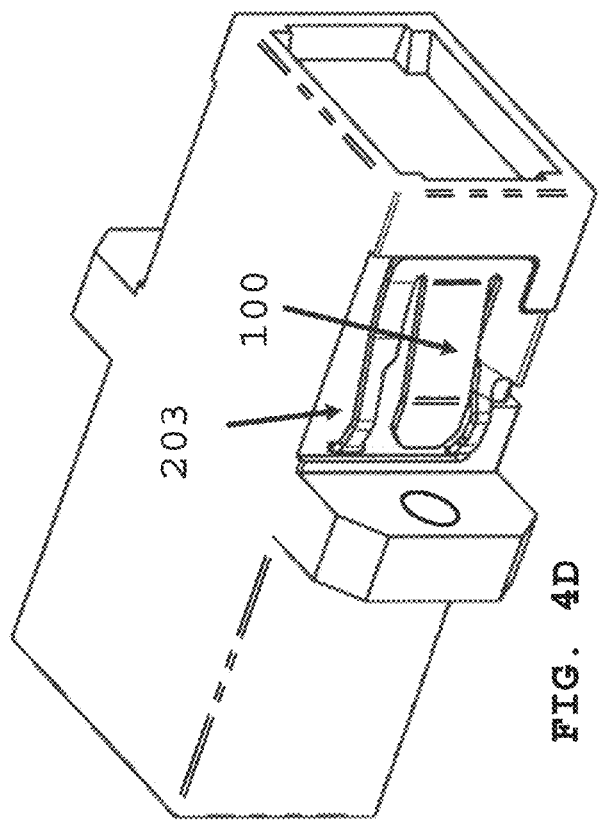
FIG. 4B a front view of FIG. 4A.
Figure 4C:
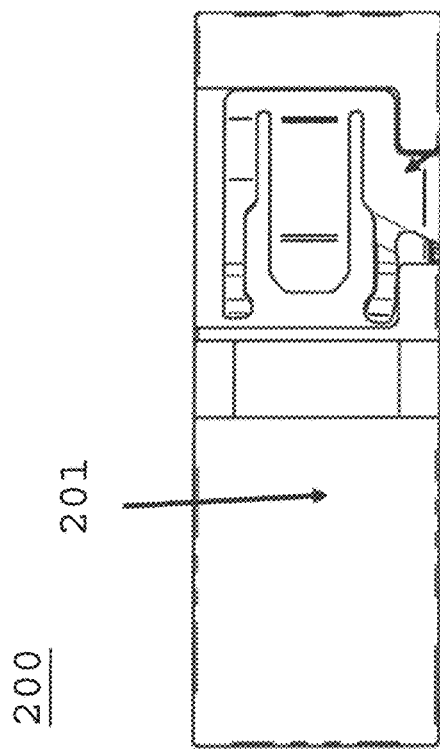
FIG. 4C is a top of FIG. 4A.
Figure 4D:
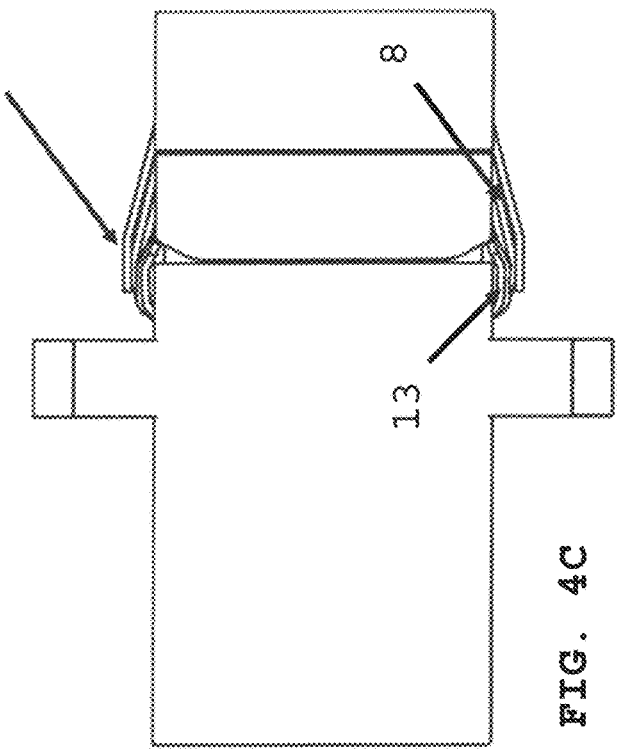
FIG. 4D is a side-front view of FIG. 4A.

FIGS. 4A-4D depict adapter assembly (200). FIG. 4A is a side view of adapter assembly (200) illustrates panel hook (100) secured about an outer housing (201) of the adapter. Panel hook (100) is secured within a recess of outer housing (201). FIG. 4B is a front view of FIG. 4A illustrating elastic pawl (8) and elastic members (13). FIG. 4C depicts a top view of adapter assembly (200) illustrating elastic pawl (8) is outside of elastic members (13). FIG. 4D depicts a second side view with hook portion (100) within recess (203) of adapter housing.

FIGS. 5A-5E depict section views of adapter assembly (200). FIG. 5A depicts the sections A-A, B-B, C-D and D-D disclosed in FIGS. 5B-5E. FIG. 5B depicts section view A-A of front end view illustrating end of elastic pawl (8). FIG. 5C depicts cross-section along view B-B, which illustrates elastic members (13) and elastic pawl (8) within gap (303). FIG. 5D depicts elastic member (13) along section view C-C. FIG. 5E depicts elastic member (13) within housing gap (303) along view D-D.

Figure 8:
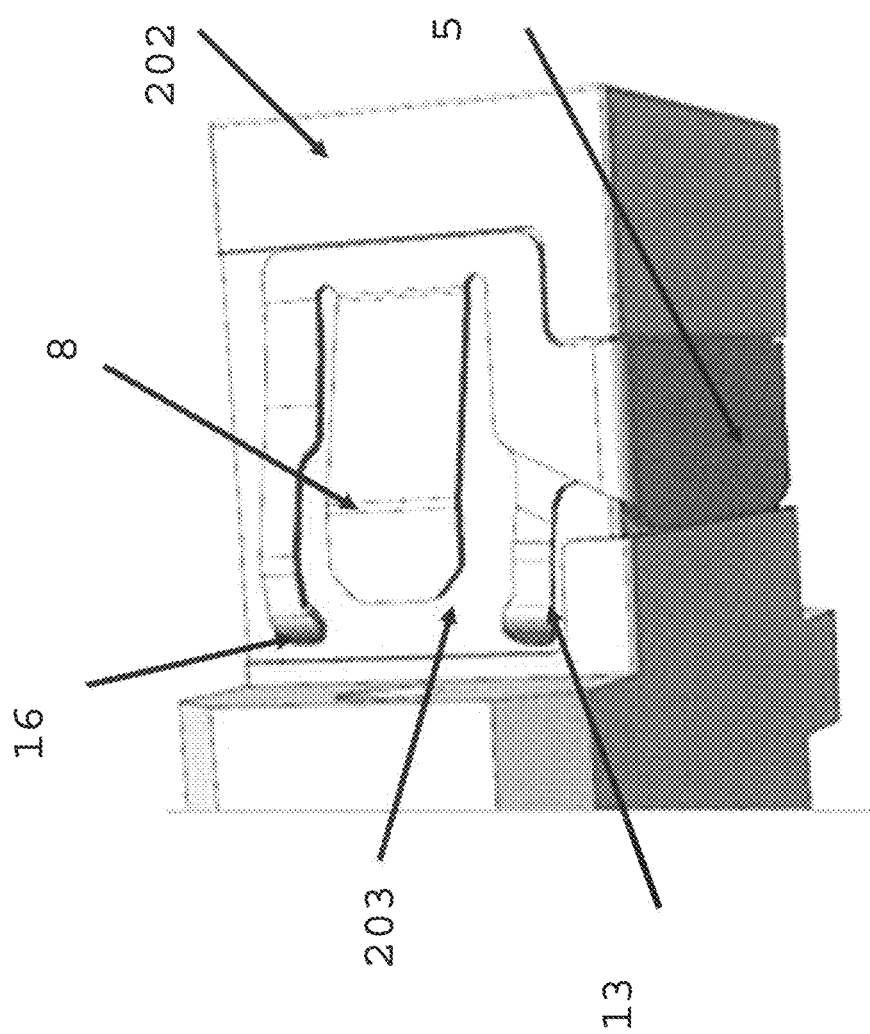
FIG. 8 is another embodiment of the adapter assembly.

FIG. 6A depicts right hand side view adapter assembly (200) within an opening of panel (300). FIG. 6B is a zoomed view of FIG. 6A where adapter assembly (200) is within panel (300) and elastic member (13) is secured within gap (303). FIG. 7A depicts left hand side view of adapter assembly (200) within an opening of panel (300). Elastic member (13) is within gap (303) of panel (300). FIG. 7B is a zoomed view of FIG. 7A illustrating more closely elastic member (13) within gap (303). FIG. 8 depicts recess (203) positioned on the top of outer housing (201) of the adapter as opposed to side as depicted in FIG. 4. Joining plate (5) interconnects elastic members (13) bent inward with a series of folds (16).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e. "a" and/or "an" should be interpreted to mean "at least one" or "one or more"); the same holds true for the use of definite articles used to introduce claim recitations. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). The phrase "A or B" will be understood to include the possibilities of "A" or "B" or "A and B.

What is claimed:

1. An adapter assembly, comprising:
   an outer housing having a recess; and
   an adapter panel hook configured to be received in the recess, the adapter panel hook comprising:
      a first side portion and a second side portion supported so that the first and second side portions are spaced apart along a lateral axis, each of the first side portion and the second side portion having opposite first and second ends spaced apart along a transverse axis perpendicular to the lateral axis, each of the first and second side portions comprising:
         an elastic pawl having a proximal end portion and a distal end portion spaced apart along a longitudinal axis, each elastic pawl being bent outwardly such that the distal end portion is spaced apart outwardly along the lateral axis with respect to the proximal end portion of the elastic pawl; and
         first and second elastic members spaced apart along the transverse axis such that the elastic pawl is located between the first and second elastic members along the transverse axis, each of the first and second elastic members having a proximal end portion and a distal end portion spaced apart along the longitudinal axis, each elastic member being bent inwardly such that the distal end portion of each of the first and second elastic member is angled to extend inward along the lateral axis as the distal end portion extends in a proximal-to-distal direction along the longitudinal axis.

2. The adapter assembly according to claim 1, further comprising a joining plate connecting the first side portion to the second side portion.

3. The adapter assembly according to claim 2, wherein the joining plate defines a joining plate plane and wherein the first side portion and the second side portion are substantially perpendicular to the joining plate plane.

4. The adapter assembly according to claim 1, wherein each elastic member comprises a plurality of bends adjacent to the distal end portion.

5. The adapter assembly according to claim 4, wherein the plurality of bends of each elastic member are configured such that the elastic member angles progressively more laterally inwardly toward the distal end portion.

6. The adapter assembly as set forth in claim 1, wherein on each of the first and second side portions, the distal end portion of the elastic pawl is spaced apart outwardly of the distal end portions of the first and second elastic members along the lateral axis.

7. The adapter assembly as set forth in claim 1, wherein each elastic pawl includes a proximal segment, a distal segment, and a bend between the proximal segment and the distal segment.

8. The adapter assembly as set forth in claim 7, wherein each proximal segment is angled to extend outward along the lateral axis as the proximal segment extends in a proximal-to-distal direction along the longitudinal axis.

9. The adapter assembly as set forth in claim 8, wherein the bend of each elastic pawl defines an angle between the proximal segment and the distal segment on an inner lateral side of the elastic pawl, the angle being less than 180°.

10. The adapter assembly as set forth in claim 9, wherein the angle is an obtuse angle.

11. The adapter assembly as set forth in claim 1, wherein the adapter is configured to be received in an opening in a panel.

12. The adapter assembly as set forth in claim 11, wherein the distal end portion of each elastic member is configured to be fitted into a gap between the adapter housing and the panel when the adapter is received in the opening in the panel.

13. The adapter assembly as set forth in claim 12, wherein the distal end portion of each elastic member being fitted into the gap binds the adapter assembly to the panel and limits transmission of vibrations from the panel to a connector mated with the adapter assembly.

14. The adapter assembly as set forth in claim 11, wherein the distal end portion of each elastic pawl is positioned to block the adapter assembly from being pushed through the opening in the panel.

* * * * *